United States Patent [19]

Suzuki et al.

[11] Patent Number: 4,825,068
[45] Date of Patent: Apr. 25, 1989

[54] METHOD AND APPARATUS FOR INSPECTING FORM, SIZE, AND SURFACE CONDITION OF CONVEYED ARTICLES BY REFLECTING IMAGES OF FOUR DIFFERENT SIDE SURFACES

[75] Inventors: Motofumi Suzuki; Hiromu Maeda, both of Shizuoka, Japan

[73] Assignee: Kabushiki Kaisha Maki Seisakusho, Shizuoka, Japan

[21] Appl. No.: 86,953

[22] Filed: Aug. 19, 1987

[30] Foreign Application Priority Data

Aug. 30, 1986 [JP] Japan ................................. 61-204588

[51] Int. Cl.$^4$ ..................... G01N 9/04; G06M 7/00; H01J 40/14
[52] U.S. Cl. ................................. 250/223 R; 250/226
[58] Field of Search ............... 250/223 R, 226, 560, 250/224, 228; 209/576, 577, 578, 579, 580, 581, 582, 585, 586, 587; 358/106, 107; 356/236

[56] References Cited

U.S. PATENT DOCUMENTS

| | | | |
|---|---|---|---|
| 3,901,793 | 8/1975 | Buchot et al. | 209/578 |
| 4,147,619 | 4/1979 | Wassmer et al. | 250/223 R |
| 4,280,624 | 7/1981 | Ford | 209/585 |
| 4,309,746 | 1/1982 | Rushworth | 250/228 |
| 4,350,442 | 9/1982 | Arild et al. | 209/577 |
| 4,377,743 | 3/1983 | Bolt et al. | 250/223 R |
| 4,534,470 | 8/1985 | Mills | 209/585 |
| 4,540,281 | 9/1985 | Akiyama | 356/236 |
| 4,630,736 | 12/1986 | Maughan et al. | 209/581 |
| 4,645,922 | 2/1987 | Welbourne | 250/226 |
| 4,699,273 | 10/1987 | Suggi-Liverani et al. | 209/580 |

Primary Examiner—David C. Nelms
Assistant Examiner—William L. Oen
Attorney, Agent, or Firm—Toren, McGeady & Associates

[57] ABSTRACT

A method and apparatus for inspecting appearance of articles while they are transported on a conveyor by reflecting images of four different side surfaces of the article being by means of a plurality of reflecting means arranged above and at both sides of a conveying path on the conveyor to transmit the four images onto a sensor surface of a sensor camera, reflecting an image of a top surface of the article onto the sensor surface of the sensor camera in the array with the four images, and scanning and photographing the images of five different surfaces of the article formed on the sensor surface of the sensor camera by the sensor camera at every preset amount of movement of the article synchronized with the conveyor, and processing the photographed images so as to measure and inspect the form, size and surface conditions of the article by using only one sensor camera at the same time. The method and apparatus can reliably cover five of the six partial surfaces, front and rear, right and left, and upper and lower, of an article, that is, 5/6=83 % of the whole surface of an article in the inspection of surface conditions.

19 Claims, 9 Drawing Sheets

METHOD AND APPARATUS FOR INSPECTING FORM, SIZE, AND SURFACE CONDITION OF CONVEYED ARTICLES BY REFLECTING IMAGES OF FOUR DIFFERENT SIDE SURFACES

BACKGROUND OF THE INVENTION

1. Field of the Invention:

The present invention relates to a method and an apparatus for inspecting the appearance of articles, particularly a method and an apparatus for measuring and inspecting the form, size and surface conditions (such as color, damage, surface ruggedness, etc.) of articles, for example, ball like fruits, vegetables or the like, by photographing the articles by means of a sensor camera and processing their pictures so as to sort them by classifying and grading.

2. Description of the Related Art:

Conventionally, the following apparatuses have been provided which inspect the form, size and surface conditions of fruits, vegetables or the like by using a sensor camera or sensor cameras:

(a) Apparatuses using the inspecting method wherein a sensor camera placed above or at one side of a conveyor photographs the one sided surface of each fruit, vegetable or the like being conveyed (cf. Japanese laid open patent application Sho 55-18285);

(b) Apparatuses using the inspecting method wherein two sensor cameras placed at opposite sides of a conveyor photograph the two sided surfaces of each article being conveyed (cf. Japanese laid open patent application Sho 59-87081);

(c) Apparatuses using the inspecting method wherein four sensor cameras placed at both sides of a conveyor photograph the four sided surfaces of each article such as fruit or vegetable dropped from the other conveyor onto that conveyor (cf. U.S. Pat. No. 4,324,335); and (d) Apparatuses using the inspecting method wherein a sensor camera placed above a roller conveyor photographs the peripheral part of each article such as fruit or vegetable being conveyed while rotating at a high speed in the conveying direction (cf. U.S. Pat. No. 4,122,951).

To sort round, oval or ball like articles or objects such as fruits or vegetables (hereinafter referred to as "articles") by classifying and grading according to the form, size and surface conditions (such as color, damage, etc.), it is very important to inspect the parts of each article representing the form and size thereof as well as the peripheral surface of the article.

However, the conventional techniques as described above cannot satisfy these requirements.

The method (a) cannot sort articles correctly, because it can inspect only the top or one-sided surface of each article, that is, the limited surface of the article, leaving a large part of its overall surface not inspected.

The method (b) can inspect both sides of the article, that is, a larger part of its overall surface than the method (a). However, the method (b) cannot sort articles correctly, because large parts of their surfaces are left not inspected. Especially, an article like a lemon which presents different forms and sizes of its images according to its orientation cannot be correctly measured and inspected, because it presents different images in size between when its axis is placed in the crosswise direction of the conveyor and when it is in the longitudinal direction of the conveyor. Therefore, it is required to align all articles of this type in the same orientation on the conveyor.

However, it is very difficult to align all articles automatically in the same orientation on the conveyor.

The method (c) can inspect all four sides of an article, that is, a larger part of its surface than the method (b). However, this method presents the disadvantages that the upper and lower parts of the article surface in the dropping direction cannot be inspected and that the part of the article representing the size of the article cannot be measured in form and size, because the orientation of the article cannot be effectively controlled.

The method (d) presents the disadvantages that although it can inspect the peripheral or side surface of an article like a lemon which can be rotated around its core axis in a high circumferential speed, the end parts of the article in the axial direction are left not inspected, that it tends to swing and jump the article in the unstable position during the conveying by rollers so that it is not practically applicable to such articles, and that a small article may be rotated by a turn or more in the same photographing period so that a part of its surface is repeatedly inspected, while a big article may be rotated by less than a turn in the same photographing time so that a part of its surface is left not inspected.

Since objects having different circumferences cannot be rotated by a turn at the same time on the same roller conveyor, the rate of circumferential rotation, which is dependent upon the circumference of the article, makes the inspected areas of articles different from each other.

The methods (c) and (d) which can inspect a larger area of an article than the methods (a) and (b) present the disadvantage that they tend to deteriorate the commercial value (marketability) of articles by giving damages such as bruises or scratches during the dropping or the hig-speed rotation of articles.

In addition, the methods (c) and (d) cannot measure in form and size the part of an article representing the size of the article, because the articles cannot be kept in the same orientation.

The methods which use a plurality of sensor cameras such as the method (c) are complicated and expensive.

To measure and inspect the whole surface of a ball like article, it is preferable that at least the front and rear parts, right and left parts, and upper and lower parts of an article are inspected.

To inspect the six parts of an article, the article may be suspended, or transported on a transparent conveyor. However, the suspension presents the same disadvantages as the method (c), and is not practically applicable. A transparent conveyor may be opaquely stained in its transparent parts during the transportation of articles so that it is not applicable to an inspecting apparatus for many articles.

Articles such as fruits and vegetables tend to receive more damages such as bruises and scratches on their surfaces, in proportion to the number of processes of dropping or rotation to which they are subjected. Therefore, it has been an object of the art to develop a method and apparatus which can inspect a larger surface part of each article without dropping or rotating articles.

SUMMARY OF THE INVENTION

An object of the present invention is to eliminate the disadvantages of the conventional techniques.

Another object of the present invention is to provide a method and an apparatus which can measure and inspect ball like articles being transported in a stable position on a conveyor by using a sensor camera, especially the form and size of the part of each article representing the size thereof as well as the conditions of the whole exposed surface of the article except for the lower part thereof in contact with the conveyor.

To attain these objects, the present invention uses means as described below.

A belt conveyor having a continuous conveying face in the same plane may be used as the means for carrying ball like articles so as to facilitate the automatic feed of articles.

This belt conveyor has no compartment in the running direction so that articles can be placed on the conveyor at any given position, and can provide the automatic supply of articles one after another.

To stabilize the ball like articles which tend to roll out, it is preferable that the conveying face be concavely formed in the central part to the extent that the side surface of each article can be photographed without any obstacle. The most preferable is, for example, a sorting conveyor as described in the Japanese Laid-Open Patent Application No. Sho 58-135026.

The conveying means may be designed by using a conveyor as described above so that it can provide the automatic supply of articles at random, the articles being indefinitely spaced between each other by not smaller than a predetermined distance below which the photographing operation of the sensor camera is prevented.

One of the generally known color sensor cameras may be placed above the conveying path to measure and inspect the form, size and surface conditions (colors, damages, etc.) of each article being transported. Preferably, the color sensor camera, which contains solid image sensors to prevent any after-image phenomenon, is used to photograph running articles sequentially.

Either of area image sensors and linear image sensors may be used. However, the sensor camera which contains linear image sensors is preferably used, because the linear image sensors make it easier to mount lighting means for the partial surfaces of an article as described hereinafter, as well as reflecting means for the partial surfaces of the article, and to minimize the distances between articles in the running direction thereof.

The most preferable is the sensor camera which contains the high-speed high-sensitivity color CCD linear image sensors with R. G. B filters on-chip formed at the light receiver part of the sensor, which are generally used, for example, for the color scanner of a color facsimile or a color copying machine.

Various reflecting means (surface reflecting mirrors, prisms or other optical mirrors) that permit the sensor camera placed above the conveying path to take the four side images and one top image of the article being transported on the conveying path are placed between the sensor camera and both sides of the conveying path under the sensor camera at the inspecting position (or place), as described below, to reflect the four side (front and rear, right and left) images and one top image of the article onto the sensor surfaces of the sensor camera respectively in sequence.

Since the front and rear sides (in the running direction) of the article being transported by a conveyor are always on the conveying track, the reflecting means (hereinafter referred to as "mirrors") cannot be placed at the front and rear of the article in the running direction. According to the present invention, therefore, the whole side surface of an article is divided in four parts by the center lines of the article in the running direction and in the direction perpendicular thereto; a left front side, a right front side, a left rear side and a right rear side. To reflect the four side images of the article onto the sensor camera, a set of four first mirrors almost vertically mounted, a set of four second mirrors facing upward, and a set of intermediate mirrors facing toward the sensor camera are placed in position.

The top surface of the article may be photographed directly by the sensor camera through its lenses. However, the shooting distance is different between the top image of the article and the four side images of the article which are taken through four sets of side mirrors for reflecting and refracting. Therefore, the shooting distances may be calculated by compensating the magnifications according to the difference of the shooting distance during the image processing. This compensation is an image plane inversion.

For these reasons, it is preferable that a plurality of reflecting and refracting mirrors be used and arranged so that the five partial surfaces of the article can be reflected on the sensor surfaces of the sensor camera at the same magnification (or the same shooting distance).

Figure 1:
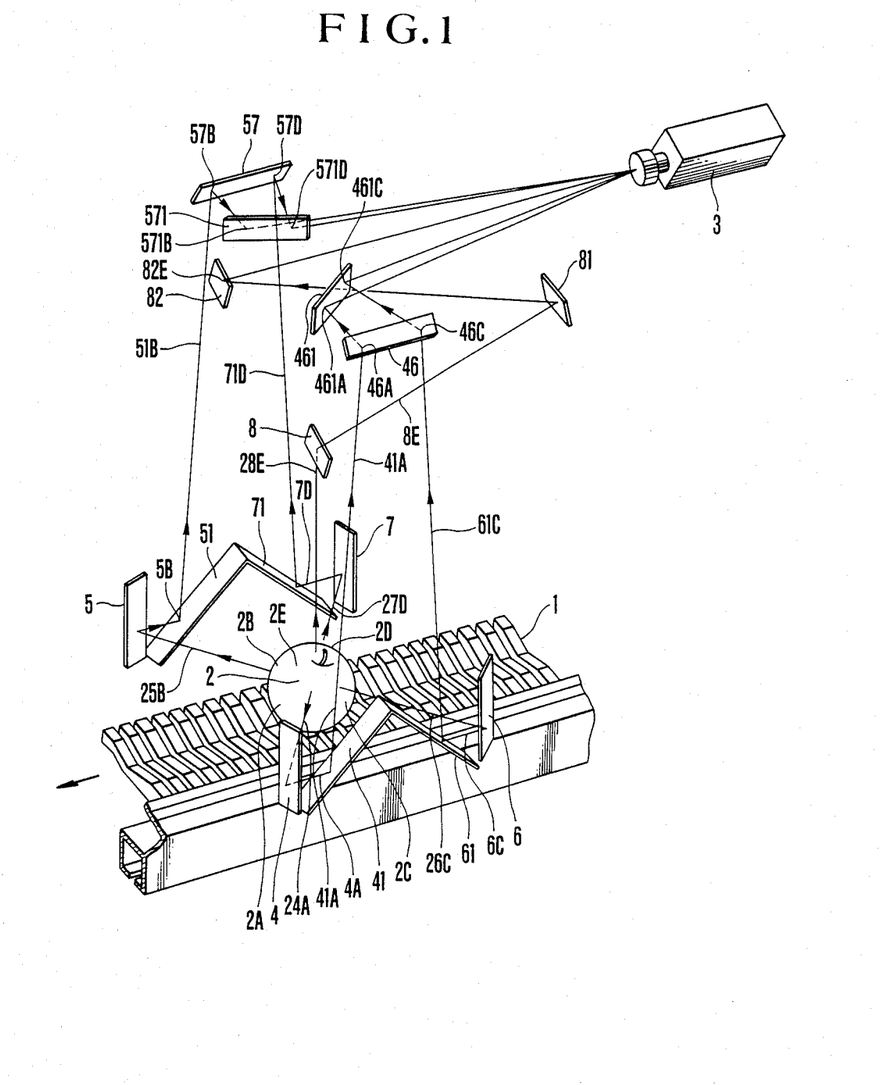
FIG. 1 is a perspective view showing the configuration of the apparatus according to the present invention.

The present invention will be detailed below by referring to FIG. 1 showing a preferred embodiment of the present invention as described hereinafter.

In FIG. 1, the four arrow-marked lateral lines and the arrow-marked upward line extending from the article placed at the center of the inspecting position toward the sensor camera through reflections show the routes of reflecting beams transmitted from the five partial surfaces of the article to the sensor camera.

The first side mirrors are placed at the first refraction points of the four arrow-marked lines extending from the four side surfaces of the article respectively, the second side mirrors are at the second refraction points respectively, the third side mirrors are at the third refraction points respectively, and the fourth side mirrors are at the fourth refraction points respectively, facing to the sensor camera. Similarly, the first top mirror, the second top mirror and the third top mirror are placed at the three refraction points of the arrow-marked line extending from the top surface of the article respectively, the third top mirror facing to the sensor camera.

The first side mirrors facing directly to the four side surfaces of the article respectively have a height equal to or greater than that of the biggest article, and are placed almost vertically. These mirrors refract and reflect the beams coming from the four side surfaces of the article onto the second side mirrors which are inclinedly placed at both sides of the conveying path in parallel thereto. Namely, the first side mirrors provide the reflecting means which reflect the side images of the article on the conveying path onto the second side mirrors at both sides of the conveying path.

The second side mirrors, which are inclinedly placed at both sides of the conveying path in parallel thereto between the first front and rear side mirrors respectively, reflect the side images of the article coming from the first side mirrors onto the third side mirrors placed above the second mirrors respectively. Namely, the second side mirrors provide the reflecting means which direct the horizontally directed images upward. The lower ends of the second inclined side mirrors are nearer to the first side mirrors and on the same level with the lower ends of the first side mirrors respectively, while the higher ends of the second inclined side mirrors are farther from the first side mirrors and on the same level with the higher ends of the first side mirrors respectively. Thus, the whole surfaces of the first side mirrors are reflected onto the third side mirrors through the second side mirrors respectively.

Each of the third side mirrors reflect the two side images of the article coming from the two corresponding second side mirrors onto the corresponding fourth side mirrors which are placed within the field of the sensor camera. Namely, the third side mirrors provide the reflecting means which direct the side images of the article coming from the two second side mirrors at each right or left side of the conveying path into the field of the sensor camera.

Each of the fourth side mirrors directs the two side images of the article reflected from the corresponding third side mirrors to the front face of the sensor camera. Combined with the third side mirrors, the fourth side mirrors are adjustable in orientation so that the four side images of the article can be aligned in the field of the sensor camera. Particularly, the fourth side mirrors are adjusted so that the four side images of the article are received by the sensor surfaces of the sensor camera in the corresponding positions.

The first, second and third top mirrors which reflect the top image of the article refract the reflected beam to form the image in the same magnification (at the same shooting distance) as that of the four side images. Assuming that the length of the arrow-marked lines extending laterally from the article at the center of the inspecting position to the sensor camera through the first, second, third and fourth reflecting and refracting side mirrors respectively is the shooting distance for the four side images and that the length of the arrow-marked line extending upward from the article to the sensor camera through the first, second and third reflecting and refracting top mirrors is the shooting distance for the top image, the side and top mirrors are arranged so that the shooting distance for the top image is equal to that for the four side images. It is understood that the third top mirror is adjusted in orientation so that the top image can be formed on the sensor surfaces of the sensor camera in the allotted position.

Figure 5:
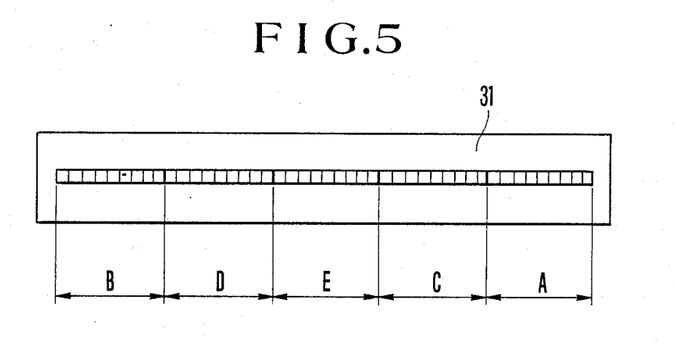
FIG. 5 is a schematic view illustrating the linear image sensors on which the five images of an article are allotted.

If linear image sensors are used in the sensor camera, the top and side images are aligned on the image sensors according to the image formation principle for the incident beam in the sensor camera, as shown in FIG. 5. Particularly, the top image is placed at the center, the left and right front side images are at both ends, and the left and right rear side images are between the top image and the left and right front side images.

According to the arrangement of the images as described above, linear image sensor are allotted to the five images.

The linear image sensors scan, form and process the five images with a pulse signal delivered at the preset rate of movement (for example, 0.5mm) synchronously with the running conveyor.

It should be noted that since the four first vertical side mirrors face to the center of the inspecting position at the right and left front and rear sides of the article respectively relative to the running direction of the conveyor, that is, they are allotted to the 1/4 parts of the peripheral article surface, as described above, the four side mirrors receive within their fields part of the beams coming from the irrelevant side surfaces of the article (adjacent to the respectively allotted side surfaces) both before the front end of the article reaches the center point of the inspecting position and after the rear end of the article has passed over the center point, and that the four side images of the article formed by the sensor camera through the reflecting mirrors are thus elongated with the added parts in the form of a crescent, though the heights of the side images are correctly displayed. These elongated parts of the side images are ignored during the image processing, because they are contained in the adjacent images to be inspected.

The side images are used mainly for the inspection of surface conditions, and used also for the measurement of article heights.

The present invention will be described below by using an area image sensor camera.

If an area image sensor camera is used, the reflecting means are large enough to reflect the whole image of the article placed at the center of the inspecting position, and the sensor camera shoots the five partial surfaces of the article at the same moment by the aid of the shutter means. The sensor camera does not shoot the article out of the center in the inspecting position, but it shoots the article just at the center of inspecting position by operating the shutter means.

Since the area image sensor camera contains larger reflecting means and has a square field of view, it is necessary to install lighting lamps far from the field of the camera.

The known devices as described in the Japanese Laid-Open Patent Application No. Sho 59-87081, may be applied to the measurement of forms and sizes, the inspection of color and damage, and the sorting of articles.

BRIEF DESCRIPTION OF THE DRAWINGS

All the drawings annexed hereto show the embodiments of the present invention.

FIGS. 7 to 11 are schematic views illustrating the processes where by an article in the inspecting position passes through the field of a sensor camera.

DETAILED DESCRIPTION OF THE PREFERRED EMBODIMENTS

The present invention will be described in detail by referring to the drawings showing the preferred embodiments of the present invention.

Figure 2:
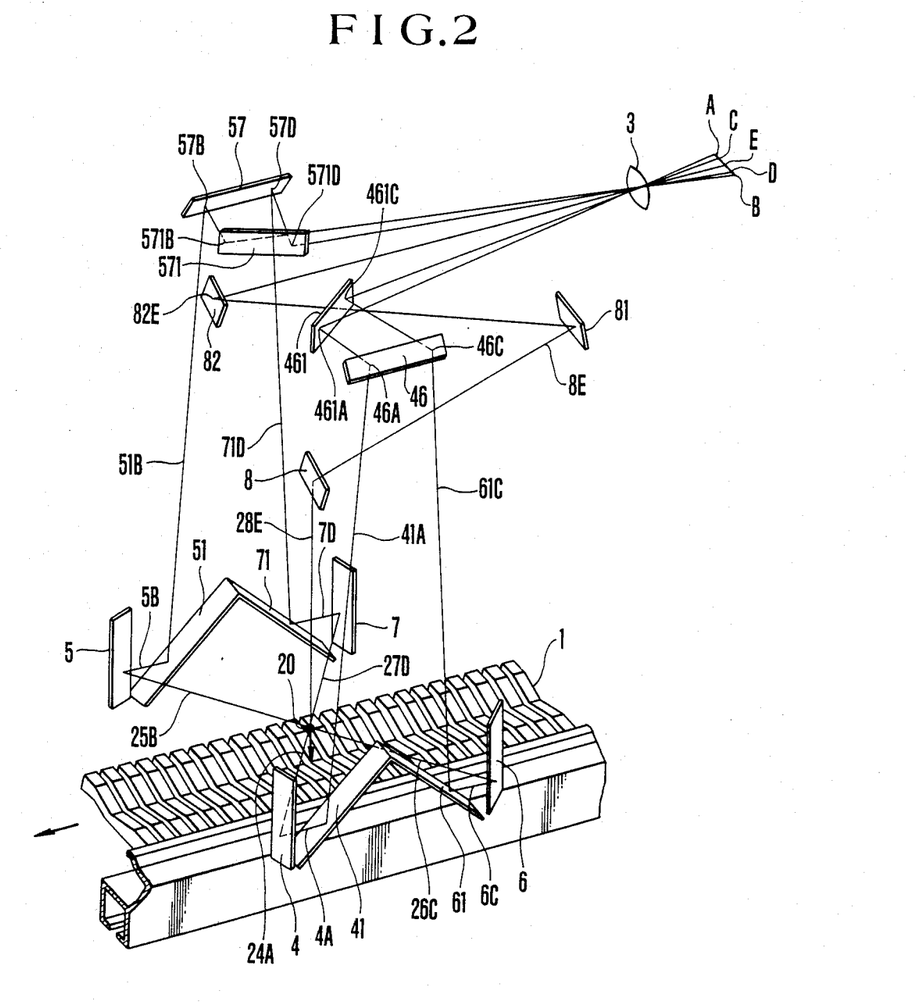
FIG. 2 is a perspective view showing the center of the inspecting position and the reflecting means according to the present invention.

FIGS. 1 and 2 are schematic views illustrating the present invention.

In FIG. 1, 1 is a conveyor, 2 is an article (a fruit in this figure), and 3 is a sensor camera.

The conveyor 1 as shown in the figures is as described in the Japanese Laid-Open Patent Application No. Sho 58-135026. However, any other type of conveyor such as a belt conveyor or sorting conveyor may be used.

4, 5, 6 and 7 are the first side mirrors which reflect the four side surfaces 2A, 2B, 2C and 2D of an article 2, and 41, 51, 61 and 71 are the second side mirrors.

The first side mirrors 4, 5, 6 and 7 are placed so that the images on them are reflected onto the second side mirrors 41, 51, 61 and 71 respectively, which are placed at both sides of the conveying path in parallel therewith and inclined upward at their ends nearer to the center point 20 of the inspecting position, as shown in FIG. 2.

Since the sensor camera 3 contains linear image sensors 31 in this embodiment, the field of the camera is formed by the vertical planes on the lines 24A, 25B, 26C and 27D connecting the center of the inspecting position and the first side mirrors, 4, 5, 6 and 7 respectively. The side surfaces of the article 2 being transported by the conveyor 1 within the field of view are reflected on the first side mirrors 4, 5, 6 and 7 and the second inclined side mirrors 41, 51, 61 and 71 respectively.

The first side mirrors 4 and 5 are placed downstream at the left and right sides of the center point 20 in the inspection position on the conveying path respectively as seen from the upstream side of the conveying path. The first mirror 4 reflects the left front side 2A of the article 2 onto the second side mirror 41. The first side mirror 5 reflects the right front side 2B of the article 2 onto the second side mirror 51.

The first side mirrors 6 and 7 are placed upstream at the left and right sides of the center 20 of the inspecting position respectively as seen from the upstream side of the conveying path. The first side mirror 6 reflects the left rear side 2C of the article 2 onto the second side mirror 61, and the first side mirror 7 reflects the right rear side 2D of the article 2 onto the second side mirror 71.

The first side mirrors 4, 5, 6 and 7 are at least as high as the highest article 2.

The lower ends of the second inclined side mirrors 41, 51, 61 and 71 are on the same level with the lower ends of the first side mirrors 4, 5, 6 and 7 respectively. The upper ends of the second side mirrors 41, 51, 61 and 71 are positioned at the middle points between the set of the first side mirrors 4 and 5 and the set of the first side mirrors 6 and 7 respectively (at both sides of the center point 20), and on the same level with the upper ends of the first side mirrors 4, 5, 6 and 7 respectively. The second side mirrors 41, 51, 61 and 71 reflect the reflected beams 4A, 5B, 6C and 7D from the first side mirrors 4, 5, 6 and 7 onto the third side mirrors 46 and 57 placed above the first and second side mirrors respectively.

The third side mirrors 46 and 57, which are placed nearer the sensor camera 3 than the article 2 and have a smaller field of view, receive the reflected beams from the four second side mirrors, that is, two each.

Particularly, the partial surfaces 46A and 46C of the third side mirror 46 receive the left front and rear side reflected beams 41A and 61C from the second side mirrors 41 and 61 respectively, while the partial surfaces 57B and 57D of the third side mirror 57 receive the right front and rear side reflected beams 51B and 71D from the second side mirrors 51 and 71 respectively, as shown in the figures.

The third side mirrors 46 and 57 reflect the reflected beams 41A, 61C, 51B and 71D onto the forth side mirrors 461 and 571 respectively, which are placed within the field of the sensor camera 3 above the conveying path.

As it is shown in the figures, the forth side mirrors 461 and 571 reflect the reflected beams from the third side mirrors 46 and 57 onto the linear image sensors 31 in the sensor camera 3 to form the images respectively.

Figure 3:
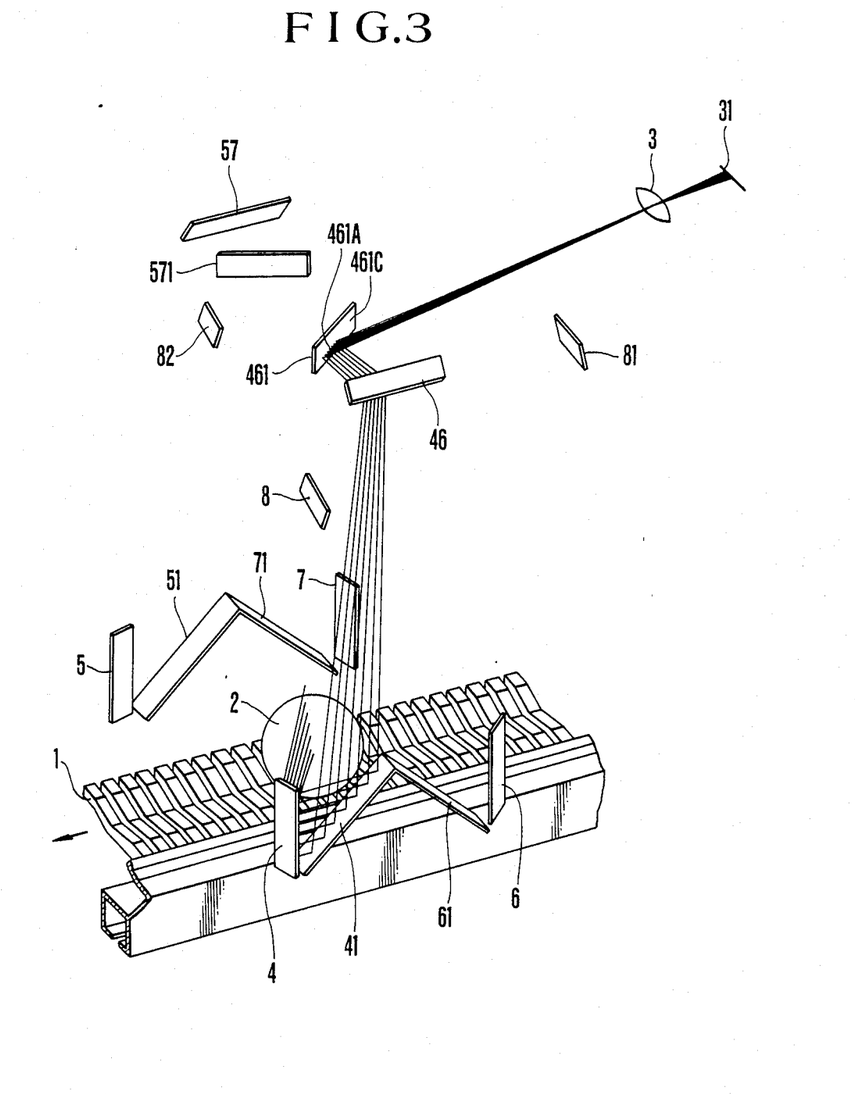
FIG. 3 is a schematic view illustrating the principle of shooting the left front side of an article according to the present invention.

In reference to FIG. 3, the vertical image of the left front side of the article 2 formed on the first side mirror 4 is reflected on the second side mirror 41 and the third side mirror 46. The image on the third side mirror 46 is almost horizontal and parallel to the conveying path.

The third side mirror 46 reflects the received image onto the forth side mirror 461. The image reflected from the forth side mirror 461 is shot by the sensor camera 3 as the image perpendicular to the conveying path or the running direction of the article 2.

Figure 4:
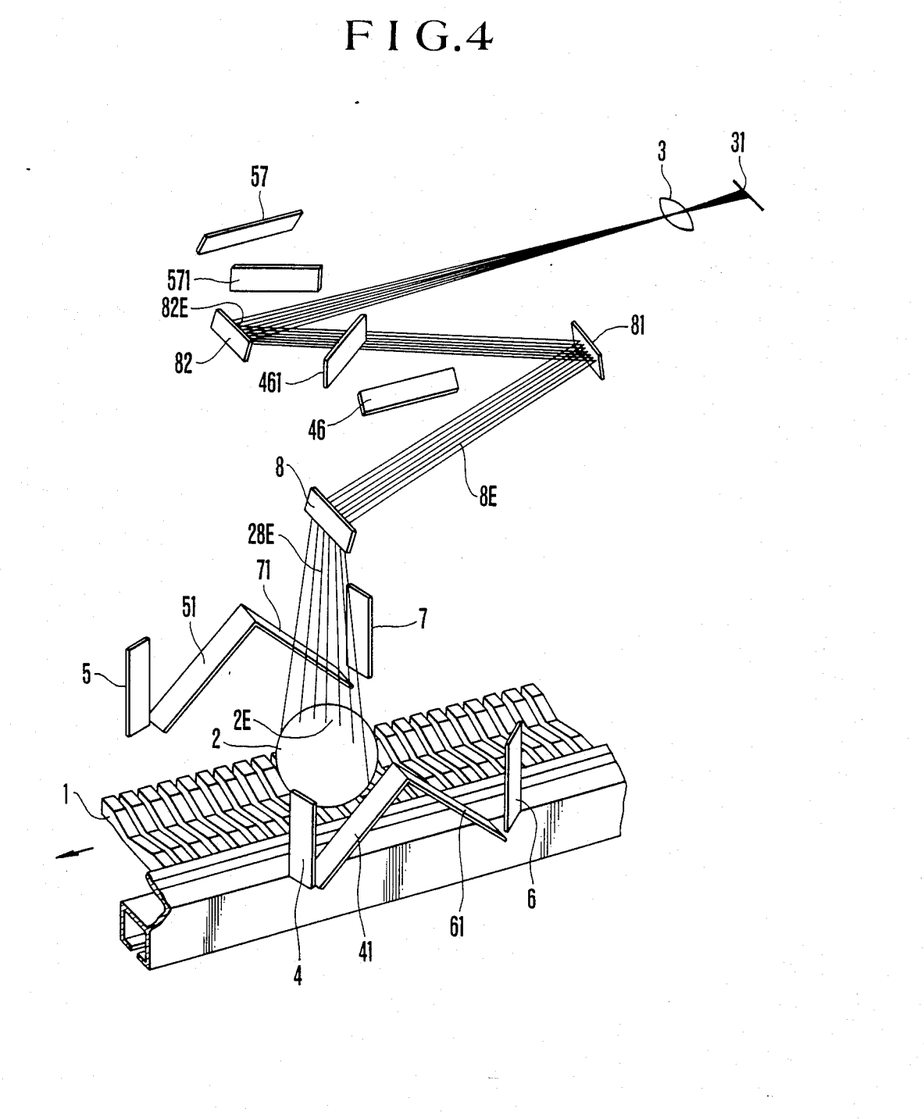
FIG. 4 is a schematic view illustrating the principle of shooting the top of an article according to the present invention.

In reference to FIG. 4, the top surface 2E of the article 2 is shot by the sensor camera 3 as described below.

The first top mirror 8 is placed above the center 20 of the inspecting position to reflect the top surface 2E of the article 2. Particularly, the first top mirror 8 has a field of view as wide as the conveying path on the conveyor 1, and it is placed so that the reflected beam 28E from the top surface 2E of the article 2, placed on the line 21 intersecting the running direction at the center point 20, is reflected by the first top mirror 8 toward the second top mirror 81.

The second top mirror 81 is placed so that the reflected beam 8E from the first top mirror 8 is reflected by the second top mirror 81 onto the third top mirror 82.

The third top mirror 82 is placed on the same level with the forth side mirror 461 so that the reflecting surface 82E of the third top mirror 82 is almost horizontally aligned with and between the reflecting surface 461A and 461C of the forth side mirror 461 and the reflecting surface 571B and 571D of the forth side mirror 571, as seen from the side of the sensor camera 3.

Since the second top mirror 81 is provided simply to make the shooting distance equal to the length (or distance) of the reflected beams by the side mirrors, the position of the second top mirror 81 in the running direction of the article 2 may be calculated in relation with that of the third top mirror 82.

In reference to FIG. 2, the four reflected beams extending from the center point 20 to the sensor camera 3 through the first, second, third and forth side mirrors respectively are as long as the reflected beam extending from the center point 20 to the sensor camera 3 through the first, second and third top mirrors, and the former and the latter are both within the focus depth of the sensor camera 3.

Thus, the reflecting beams from the five partial surfaces 2A, 2B, 2C, 2D and 2E of the article 2 reach the linear image sensors 31 in the sensor camera 3, where the corresponding images are formed on the sequence of positions (the surfaces of image sensors) A, B, C, D and E as shown in FIG. 5 respectively.

Figure 6:
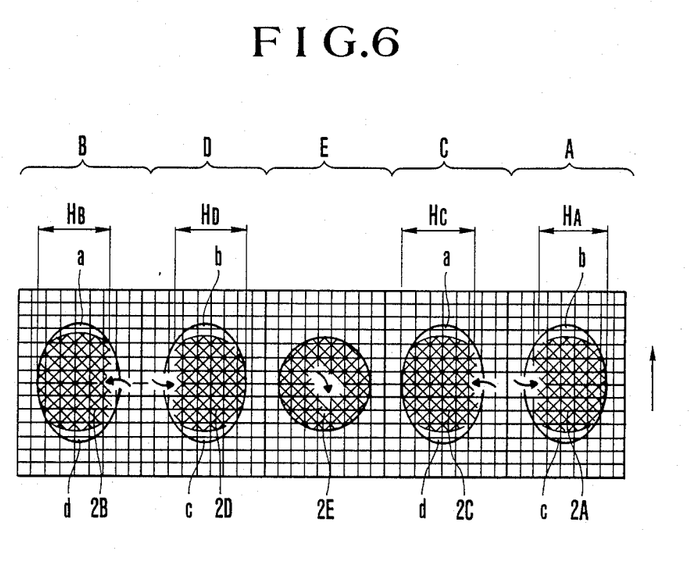
FIG. 6 is a schematic view illustrating the five images of an article.

The pictures of the five partial surfaces thus shot are formed as shown in FIG. 6.

The formed pictures are then measured and inspected by the known processing means.

Particularly, the form and size of an article (diameter, major axis, minor axis, area, circumference, etc.) are calculated by the known image analysis from the top picture 2E.

The height of an article is calculated as the average of the heights $H_A$, $H_B$, $H_C$ and $H_D$ of the four side pictures 2A, 2B, 2C and 2D.

The surface conditions (color, damage, etc.) of an article are inspected by the known processing means from the five pictures of the article. The peripheral part of each picture is contained also in the pictures of the adjacent surfaces (for example, the top picture of an article is partially contained in the side pictures of the article). Since the peripheral parts of the pictures contain no information on the partial surfaces perpendicular to the partial surfaces corresponding to the pictures respectively, they may be preferably ignored in the image processing stage.

Figure 7:
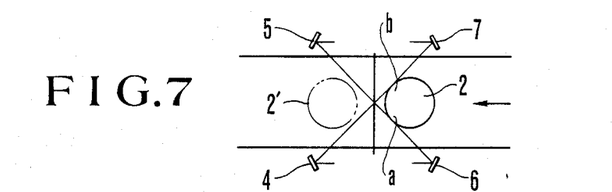
FIG. 7 shows the conditions where an article is about to enter the field of the camera.
Figure 8:
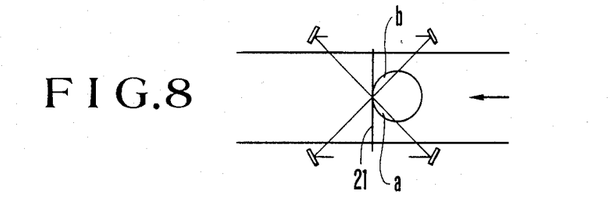
FIG. 8 shows the conditions where the front end of the article reaches the center of the inspecting position and where the top surface of the article starts to be shot.
Figure 9:
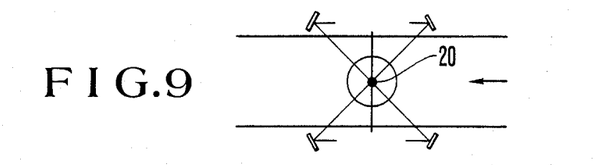
FIG. 9 shows the conditions where the five partial surfaces of an article are shot by the camera.
Figure 10:
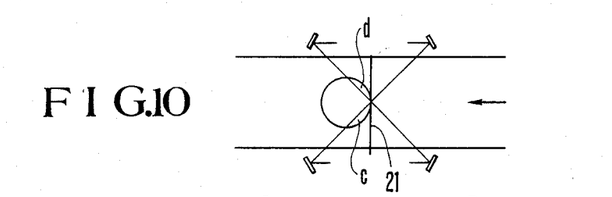
FIG. 10 shows the conditions where the top of the article has been shot.
Figure 11:
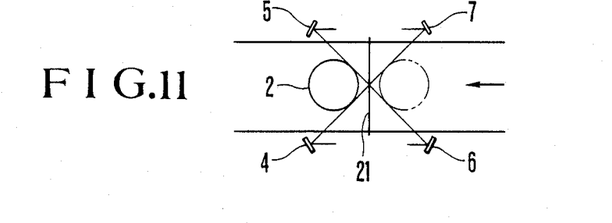
FIG. 11 shows the conditions where the article is going out of the field.
Figure 12:
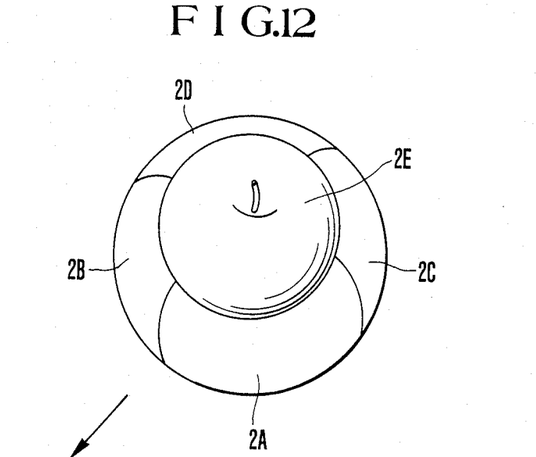
FIG. 12 is a schematic view showing the five partial surfaces of an article to be shot.

In FIG. 6, the four side pictures 2A, 2B, 2C and 2D are more elongated than the real forms of the corresponding partial side surfaces 2A, 2B, 2C and 2D of the article 2. The elongated parts a, b, c and d of the pictures 2A, 2B, 2C and 2D are pictures resulting from the facts that the left front side a and right front side b of the article 2 are reflected on the irrelevant first side mirrors 5, 6 and 4, 7, while the article 2 is moving from the entering point in the field of the side mirrors as shown in FIG. 7 to the shooting start point (the center point 20 of the inspecting position) as shown in FIG. 8, and that the left rear side c and right rear side d of the article 2 are reflected on the irrelevant first side mirrors 4, 7 and 5, 6, while the article 2 is moving from the top surface shooting end point as shown in FIG. 10 to the exit point from the field of the side mirrors as shown in FIG. 11. These elongated parts a, b, c and d of the pictures do not correspond to the pictures to be inspected, and may be ignored during the image processing.

Similarly, the partial top pictures contained in the four side pictures may be ignored during the image processing because of their duplicate imaging.

Thus processed, the five partial surfaces of the article, exposed on the conveyor, can be inspected with reliability except for the bottom surface of the article 2 in contact with the conveyor 1.

Figure 13:
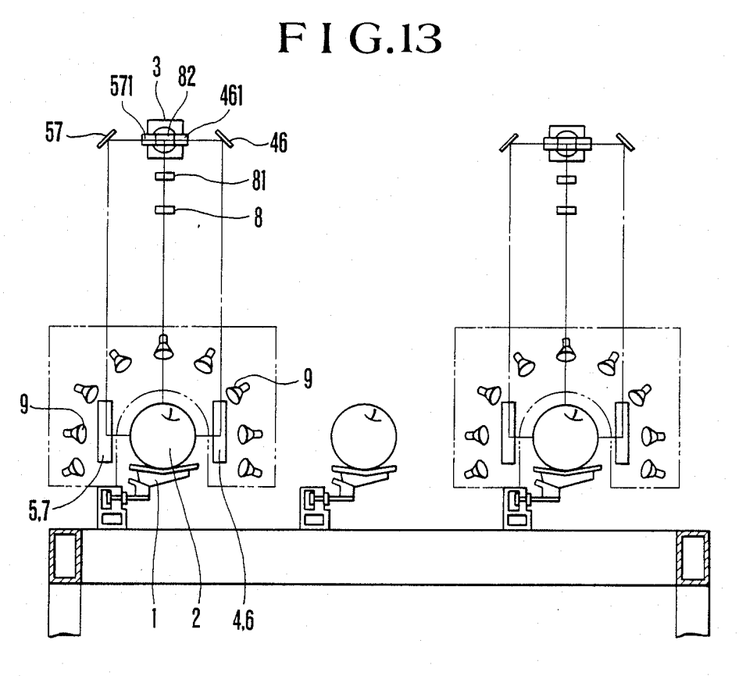
FIG. 13 is a schematic view showing the apparatus containing lighting means according to the present invention.
Figure 14:
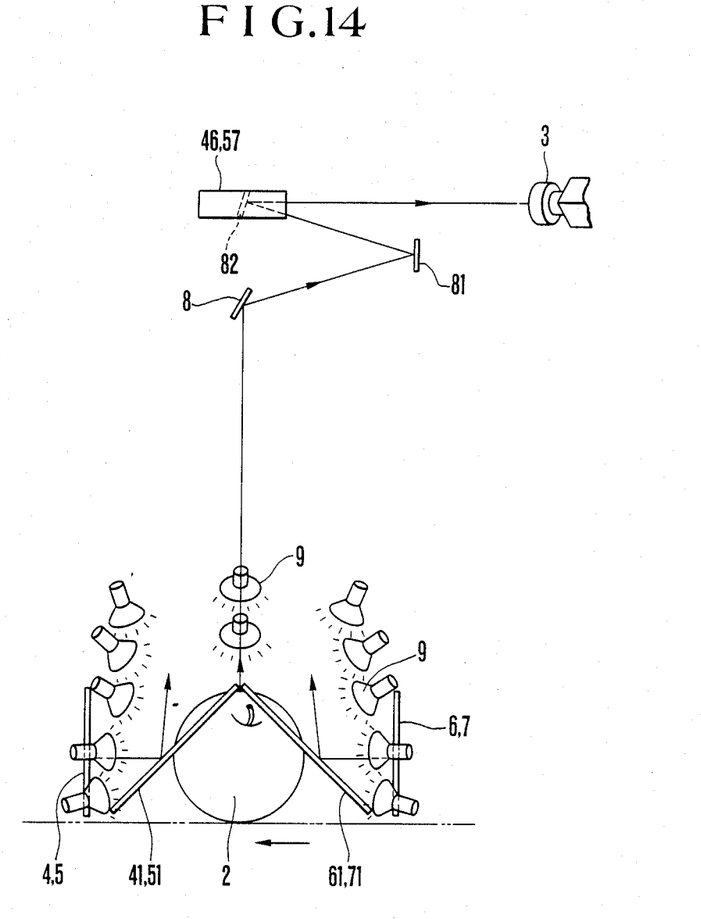
FIG. 14 is a side view illustrating the main part of the apparatus containing lighting means according to the present invention.
Figure 15:
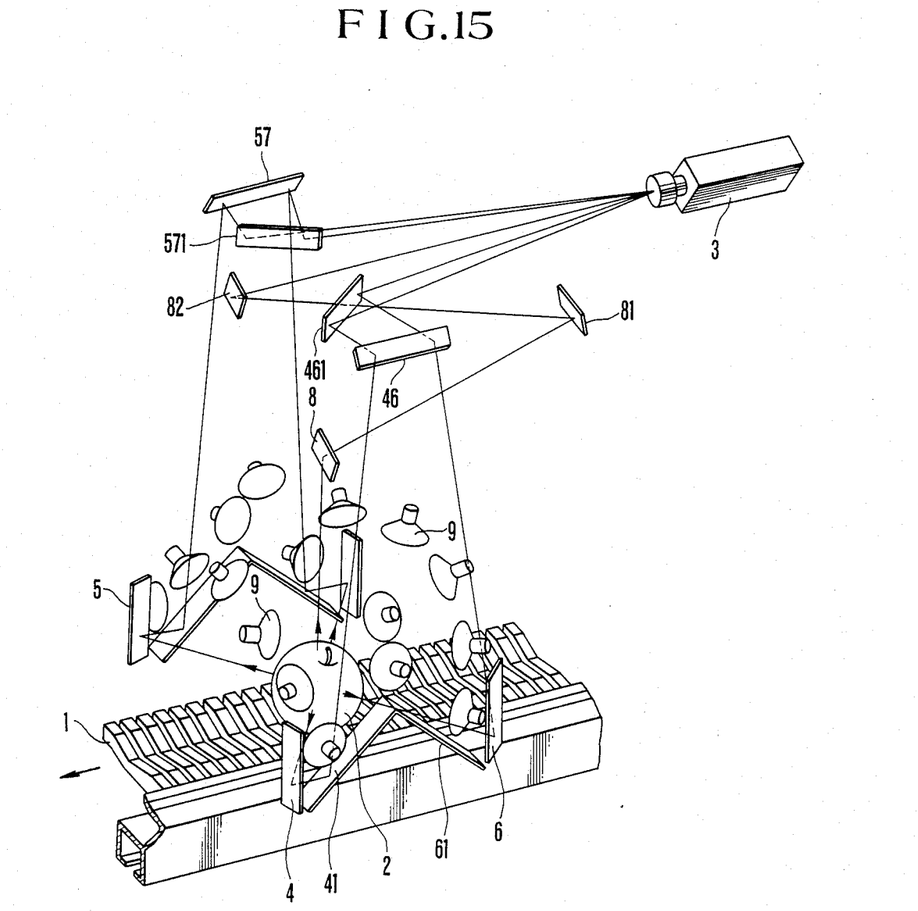
FIG. 15 is a perspective view showing the whole apparatus of the invention including the lighting means.

If the sensor camera 3 contains linear image sensors 31 as in this embodiment, the field of the camera is developed in the form of a curtain in five directions by refractions. Since there are dead spaces between reflecting beams, many small lighting lamps 9 may be properly arranged around the article 2 to light the partial surfaces of the article 2 almost in the form of a ball.

The small lighting lamps 9 thus arranged can light the whole surface of the article 2 uniformly except the bottom part thereof to provide clearer picture information.

The distance between articles 2 being conveyed will be described below from the conditions where the article 2 passes over the inspecting position as shown in FIGS. 7 to 11.

As it is shown in FIG. 7, a distance between articles 2 is desirable such that the right and left rear sides of the preceding article 2' is out of the intersecting fields of the first side mirrors 4, 5, 6 and 7 when the right and left front sides a and b of the next article 2 reach these intersecting fields, the two articles 2 and 2' moving from right to left in the figure.

In other words, it is preferable that the articles 2 and 2' are sequentially positioned on the conveyor outside the two lines intersecting at the center point of the inspecting position, that is, it is sufficient that the distance between articles is equivalent to the length of the biggest article.

Since the foregoing description and the drawings annexed hereto are related to one embodiment of the present invention, but not limited to it, it is understood that the plural reflecting means and the camera sensor as described in the claims may be provided in any other configuration.

As it has been described above, the present invention permits a sensor camera to shoot the top surface and four different side surfaces of an article at the same time. Therefore, the present invention can cover five of the six partial surfaces, front and rear, right and left, and upper and lower, of an article, that is, 5/6=83% of the whole surface of an article, reliably in the inspection of surface conditions.

In addition, the present invention can measure the size of articles from their top pictures as well as the height of articles from their side pictures so as to classify articles by size and grade them more correctly.

In short, the automatic sorting of fruits, vegetables and other articles is realized by the present invention.

We claim:

1. A method of inspecting the appearance of opaque articles, comprising: transporting the opaque articles in a stable manner on a conveyor moving along a conveying path, reflecting images of four different side surfaces of an article being transported on the conveyor by using a plurality of reflecting means arranged above and at both sides of said conveyor at an inspecting position to transmit the four images onto a sensor surface of a sensor camera, reflecting a fifth image of a top surface of said article onto the sensor surface of said sensor camera in array with said four images, scanning and photographing the five images of said five different surfaces of said article formed on said sensor surface of said sensor camera at every preset amount of movement of said article and synchronized with movement of said conveyor, and processing the photographed images so as to measure and inspect form, size and surface conditions of said article by using only one sensor camera.

2. A method according to claim 1, wherein said four different side surfaces of said article include a left front side surface, right front side surface, left rear side surface and right rear side surface of said article, and wherein said plurality of reflecting means reflect the images of said four side surfaces onto said sensor camera at the same magnification.

3. A method according to claim 1 wherein said five images are reflected onto a linear image sensor almost at the same time and are photographed by said sensor camera by scanning at the same time, and sequentially processing the five pictures thus obtained.

4. A method according to claim 1, wherein said processing of said pictures comprises calculating the form and size of said article from one or more pictures including said picture of said top surface and classifying said article by size as well as extracting information as to color and damage to said article from said five pictures and grading said articles by color intensity and extent of damage.

5. An apparatus for measuring and inspecting the appearance of opaque articles, comprising:
   means for conveying opaque articles one by one in a stable posture on a conveyor;
   image pick-up means provided with a sensor camera placed at a predetermined position in a prescribed direction of a conveying path of said conveyor;
   a plurality of reflecting means placed at both left and right sides of and above said conveying path at a measuring and inspecting position of said conveyor so that images of four different side surfaces of right, left, front and rear sides, and a top surface of said article being transported along said conveying path are reflected onto said sensor camera in array;
   means for scanning the images of said four different side surfaces and said top surface at every preset amount of movement of said conveying means, and means for processing the scanned images to determine form, size and outer surface condition of said articles.

6. An apparatus according to claim 5, wherein said means for processing comprises an operation processing part for calculating the size of said article at a specified position from an image of said top surface and the size of said article in the height direction from images of said four side surfaces, and including means for classifying said articles by size based upon calculated values of said sizes; and
   an operation processing part for extracting color and damage information for said articles from the five images and grading said articles by color intensity and degree of damage.

7. A method of measuring and inspecting articles comprising: placing a plurality of reflecting means at both sides of and above a conveying path at a measuring and inspecting position of a transport conveyor which conveys opaque articles in a stable manner, reflecting light from four different side surfaces of said articles in given directions for each one of said four side surfaces thereby to focus images of the four different side surfaces of said articles in an image pick up plane of a sensor camera located at a prescribed position, at the same time reflecting light from an upper surface of the articles in a further given direction thereby to focus an image of the upper plane of the articles in said image pick up plane at a position arraying with said four side surface images, scanning and photographing the five images in said image pick up plane of said one sensor camera at predetermined periods of time, and processing the five images so as to measure and inspect form and size of the articles and the condition of the peripheral surface thereof.

8. A method according to claim 7, wherein said four different sides of the articles comprise an oblique left front side, an oblique right front side, an oblique left rear side, and an oblique right rear side, and wherein the plurality of reflecting means reflect images of said four sides with the same magnification at the image pick up plane of the sensor camera.

9. A method according to claim 7 wherein said plurality of reflecting means for directing images of said four sides of the articles onto the image pick up plane of the one sensor camera comprise a total of twelve reflecting means including ones provided at left and right; front and rear; as well as ones provided at upper positions.

10. A method according to claim 7 wherein the image of the upper plane of said articles is photographed at a position arrayed with said four images with the same magnification in the image pick up plane of said sensor camera by using three reflecting means.

11. A method according to claim 7 wherein said sensor camera employs at least one linear image sensor at its image pick up plane.

12. A method according to claim 11 wherein said four different side images and said upper plane image appearing at said linear image sensor are photographed at positions allotted respectively in a manner such that the images are arrayed in one lateral row on the linear image sensor.

13. A method according to claim 12 wherein said five images appearing on said linear image sensor are photographed almost simultaneously and are imaged for each scan made by the sensor camera for every predetermined amount of movement in the travel of said conveyor, and the five images thus obtained are consecutively processed.

14. A method according to claim 13 wherein said processing step computes form and size of the articles from more than one image including the upper plane image for classifying and grading the articles, and at the same time color and damage data are extracted from the five images for classifying and grading the articles by coloration and extent of damage.

15. Apparatus for measuring and inspecting opaque articles comprising:
   conveying means for consecutively conveying opaque articles one by one in a stable posture on a conveyor;
   image pick up means having a sensor camera provided at a predetermined position in a prescribed direction of a conveying path of said conveyor;
   a plurality of reflecting means arrayed at both left and right sides of and above said conveying path at a measuring and inspecting position of said conveyor so that light reflected from four different side surfaces and an upper surface of said articles being conveyed on said conveyor in a stable posture is made to reflect in predetermined respective directions for each one of said surfaces for photographing images of said respective surfaces on an image pick up plane of said sensor camera; and
   processing means for measuring and inspecting form and size of said articles and condition of their peripheral surfaces by scanning and picking up images of five images photographed on the image pick up plane of said sensor camera by said sensor camera at each predetermined period of time and by respectively processing said five picked up images.

16. An apparatus according to claim 15 wherein said conveying means for conveying the articles in a stable posture comprises chain conveyors which have their conveying surfaces connected in a same plane in a proceeding direction and convey articles with random intervals but with a predetermined distance or longer therebetween.

17. An apparatus according to claim 15 wherein said plurality of reflecting means are so arrayed that a total of twelve reflecting means are positioned along the left and right sides of and above the conveying path for reflecting the four different side surface images of said articles on the image pick up plane of the sensor camera and three refracting means are positioned above the conveying path for reflecting an upper surface image of said articles onto the image pick up plane of the sensor camera to provide five images arrayed in one row.

18. An apparatus according to claim 15 wherein said means for processing obtains five respective picture images and respectively computes form and size of said articles at a predetermined position from said upper surface picture image and computes form and size of the articles in a height direction of said article from said four side surface picture images, and said processing means includes means for classifying and sorting the articles according to their size from said computed values and at the same time color and damage data are extracted out of the five picture images whereby the articles are classified and graded by degree of coloration and extent of damage.

19. An apparatus as claimed in claim 15 wherein said conveyor carries said articles with random spacing therebetween and said reflecting means simultaneously reflects the four side surface images and the top surface image onto said pick up plane of the sensor camera.

* * * * *